United States Patent Office.

THOMAS L. UPTON, OF FARMINGTON, WEST VIRGINIA.

Letters Patent No. 63,966, dated April 16, 1867.

MEDICAL VEGETABLE SALVE.

The Schedule referred to in these Letters Patent and making part of the same.

TO ALL WHOM IT MAY CONCERN:

Be it known that I, THOMAS L. UPTON, of Farmington, in the county of Marion, and State of West Virginia, have invented a new and useful Medical Vegetable Salve; and I do hereby declare that the following is a full and accurate description of the materials constituting my salve, and the mode of compounding the same.

To enable others skilled in the art to compound and use my invention, I will proceed to enumerate the several ingredients that enter into and the mode of compounding my salve.

To two pounds of dried root of *Scrophularia Marylandica*, I add two pounds of the top of the *Erigeron Philadelphicum*, two pounds of the inner bark of the *Ulmus fulva*, three pounds of *Resina alba*, one quarter of a pound of gum camphor, one quart of the *Pinus balsamea*, one pound of castile soap, two pounds of common rosin, three pounds of beeswax, and five pounds of mutton-tallow. The *Scrophularia Marylandica* is boiled thoroughly, and the woody portion withdrawn, while the remaining pulp is bruised finely, and after remaining in the liquor, which has been reduced to about one gallon, the whole is strained through a coarse linen cloth. The *Ulmus fulva* is prepared in like manner, leaving the mucilaginous liquid about one and a half gallon. The *Erigeron Philadelphicum* is also treated in the same manner, and strained, when the liquid is reduced to about two gallons. The remaining ingredients, *Resina alba*, camphor, rosin, soap, beeswax, and tallow, are melted together over the fire in an iron vessel, and when all are thoroughly dissolved, add the three prepared liquors, and boil the whole to a proper consistency, and before cooling add the *Pinus balsamea*, stirring the mass as long as it continues liquid, and when cool it is ready for use, and will be found highly efficacious in relieving sores, sprains, bruises, and rheumatism.

What I claim as my invention, and desire to secure by Letters Patent, is—

The salve, consisting of the ingredients named, in about the proportions specified, and compounded substantially as and for the purpose set forth.

In testimony whereof I have hereunto subscribed my name.

THOS. L. UPTON.

Witnesses:
T. A. MANSUBY,
JAS. O. WATSON.